United States Patent [19]

De Doncker et al.

[11] Patent Number: 5,038,267

[45] Date of Patent: Aug. 6, 1991

[54] SOFT-SWITCHING POWER CONVERTER FOR OPERATION IN DISCRETE PULSE MODULATION AND PULSE WIDTH MODULATION MODES

[75] Inventors: Rik W. A. A. De Doncker, Schenectady, N.Y.; Venkatagiri Venkataramanan, Madison, Wis.

[73] Assignee: General Electric Company, Schenectady, N.Y.

[21] Appl. No.: 521,061

[22] Filed: May 3, 1990

[51] Int. Cl.⁵ .......................................... H02M 3/335
[52] U.S. Cl. ...................................... 363/89; 363/16; 363/37; 363/56; 363/124
[58] Field of Search ....................... 363/16, 17, 37, 89, 363/124, 132, 56; 323/222, 224

[56] References Cited

U.S. PATENT DOCUMENTS 4,730,242 3/1988 Divan ..................................... 363/37
4,864,483 9/1989 Divan ..................................... 363/37

OTHER PUBLICATIONS

Liu et al., "Zero-Voltage Switching Technique in DC/DC Converters", Pesc Records, 1986, pp. 58-70.
D. M. Divan, "The Resonant DC Link Coverter—A New Concept in Static Power Conversion", IEEE-IAS Proceedings 1986, pp. 648-656.
D. M. Divan, G. Skibinski, "Zero Switching Loss Inverters for High Power Applications", IEEE-IAS Proceedings 1987, pp. 627-634.

Primary Examiner—Peter S. Wong
Attorney, Agent, or Firm—Jill M. Breedlove; James C. Davis, Jr.; Marvin Snyder

[57] ABSTRACT

A single-phase, soft-switching, ac-to-dc power converter comprises a rectifier for receiving and rectifying an ac voltage and providing the rectified ac voltage to a boost dc-to-dc converter, which in turn is coupled to an active clamped resonant dc link (ACRDCL). Resonant oscillations of the resonant dc link circuit comprising an inductor and a capacitor are maintained via control of an active clamp switching device. Soft-switching in a discrete pulse modulation scheme is achieved by controlling the switching instants of a boost switching device to occur at zero voltage instants of the resonant dc link. Alternatively, if a pair of snubber capacitors are added to the boost converter, soft-switching may be achieved in a pulse width modulation mode, resulting in reduced subharmonics even at higher frequencies and with smaller filter components.

17 Claims, 10 Drawing Sheets

SOFT-SWITCHING POWER CONVERTER FOR OPERATION IN DISCRETE PULSE MODULATION AND PULSE WIDTH MODULATION MODES

FIELD OF THE INVENTION

The present invention relates generally to power converters. More particularly, the present invention relates to a resonant power converter in which switching devices are turned on and turned off with substantially zero voltage thereacross, i.e. zero-voltage soft-switching.

BACKGROUND OF THE INVENTION

In order to comply with expected future regulations on low and high frequency distortions of main ac power lines and electromagnetic interference requirements, it is necessary to improve waveform quality of ac-to-dc converters. In general, there are two approaches to solving this problem. The first approach entails increasing size and reactance value of passive filter elements, i.e. inductors and capacitors, in order to reduce the high frequency content of the ac-to-dc converter waveforms. Disadvantageously, this approach becomes increasingly expensive at higher power levels and creates other side effects for which compensation must be provided, such as high in-rush currents, low range of stability and poor power factor. The second approach entails increasing the switching frequency of the converter waveforms such that filter size can be reduced, since filter size is inversely proportional to the frequency content of the filtered waveform. The disadvantage of this second approach resides in the need for active power devices and additional control circuitry. For many applications, the additional cost would not be compensated for by the lower cost of filter elements and/or other possible technological advantages, such as unity power factor, low in-rush currents and a higher stability range with respect to line impedance. The reason is that the highest attainable switching frequency of pulse-width modulated (PWM) converters is typically too low, e.g. below 10 kHz, at power levels above 3 kW due to high switching losses in the active devices, i.e. hard-switching.

To overcome the problem of active device switching losses, while enabling operation at higher switching frequencies, soft-switching converters have been developed. In general, there are two types of soft-switching, or resonant, converters: zero-voltage switching and zero-current switching. Zero-voltage switching involves switching the active devices when there is zero voltage thereacross. On the other hand, zero-current switching involves switching the active devices when there is zero current therethrough.

An exemplary soft-switching converter is described in U.S. Pat. No. 4,730,242 of D. M. Divan, issued Mar. 8, 1988, which patent is hereby incorporated by reference. Divan describes a high-efficiency power converter which utilizes a resonant dc link (RDCL) comprising an inductor and a capacitor coupled to a dc bus which are caused to oscillate together at a high frequency in order to provide a unidirectional resonant voltage across the dc link. Suitable control ensures that the dc link voltage resonates to zero at least once per cycle, at which time the active devices connected thereacross are switched, thereby avoiding switching losses. However, the advantages obtained in using such a circuit are partially offset by higher voltage stresses applied to the switching devices, necessitating the use of devices with higher voltage ratings. Fortunately, Divan overcame this problem by employing an active clamp in an RDCL to limit peak voltage stresses, as described in U.S. Pat. No. 4,864,483, issued Sept. 5, 1989, which patent is hereby incorporated by reference. A converter according to the latter cited patent is generally referred to as an active clamped RDCL (ACRDCL) converter.

Despite the hereinabove described developments in soft-switching converter technology, such converters are still too costly for many applications, as a result of requiring the use of multiple active devices. Therefore, it is desirable to provide a resonant converter which achieves lossless switching at high frequencies with fewer active devices. Furthermore, soft-switching converters such as those hereinabove described generally operate in a discrete pulse modulation (DPM) mode which may not provide sufficient waveform quality for many applications. Therefore, it is desirable to provide a soft-switching converter which is capable of high-resolution PWM control.

OBJECTS OF THE INVENTION

Accordingly, it is an object of the present invention to provide a new and improved soft-switching power converter.

Another object of the present invention is to provide a soft-switching, resonant dc link converter capable of operation in either a DPM or PWM mode, with low harmonic distortion of the converter waveforms, even with a relatively small filter and at relatively high switching frequencies.

Still another object of the present invention is to provide a soft-switching ac-to-dc power converter with only two active devices which can adequately modulate ac line current, at unity power factor with low distortion, using either DPM or PWM.

SUMMARY OF THE INVENTION

A single-phase, soft-switching, ac-to-dc power converter according to a preferred embodiment of the present invention comprises a rectifier for receiving and rectifying an ac voltage and providing the rectified ac voltage to a boost dc-to-dc converter, which in turn is coupled to an active clamped resonant dc link (ACRDCL). The boost converter comprises a filter inductor connected in series with a boost diode, and a boost switching device connected across the junction between the filter inductor and the boost diode and ground. An additional diode is connected in antiparallel with the boost switching device. The ACRDCL comprises: a resonant circuit, including an inductor and a capacitor; and an active clamp circuit, including a clamp switching device, a clamp diode connected in antiparallel with the clamp switching device, and a clamp capacitor. In operation, the boost converter steps up, or boosts, the rectified ac voltage, and the ACRDCL is controlled so as to provide resonant oscillations of the dc link, with the dc link resonating to zero voltage at least once per resonant cycle. The clamp switching device is controlled to maintain resonance. Furthermore, the boost switching device is turned on and off only when the voltage level across the dc link is zero, thus ensuring substantially lossless switching during device turn-on and turn-off. As a result, a soft-switching ac-to-dc converter is realized with only two active devices which can adequately modulate ac line current, at unity power factor with low distortion, using discrete pulse modulation (DPM) for many applications.

In another preferred embodiment of the present invention, the hereinabove described ac-to-dc power converter is modified to provide ac line current pulse width modulation (PWM) capability. In particular, snubber means are provided to ensure substantially lossless switching during turn-off of the boost switching device. According to one embodiment, snubber capacitors are connected across the boost switching device and the boost diode to ensure that the voltage does not rise instantaneously across the boost switching device. In this way, substantially lossless switching during device turn-off is ensured, even if the dc link voltage is not equal to zero. Therefore, since the boost switching device can be turned off in a lossless manner at any instant during the resonant cycle, a PWM ac line current control strategy may be employed, resulting in higher quality ac line current waveforms obtainable even with a reduced filter size and at higher switching frequencies. In another aspect of the present invention, this latter principle of PWM control can be applied to other ACRDCL circuit topologies.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
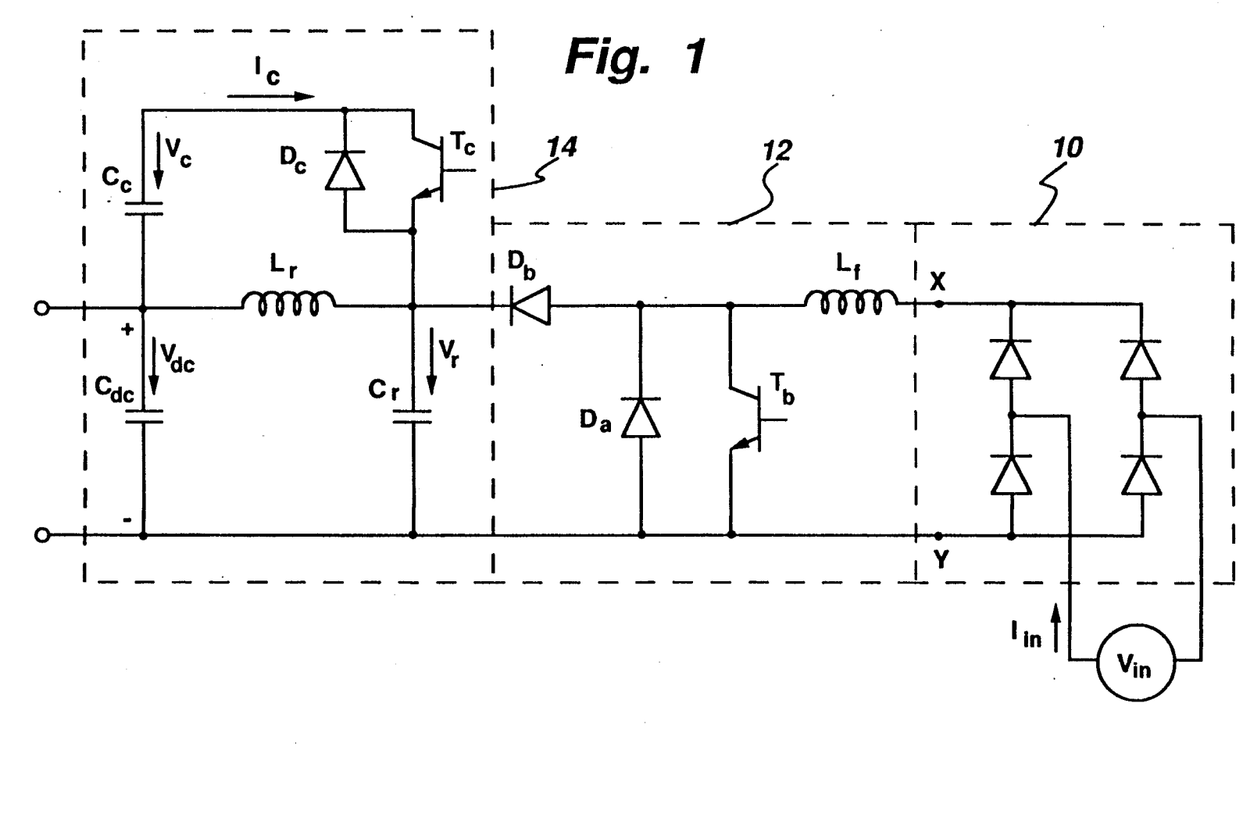
FIG. 1 is a schematic illustration of a resonant ac-to-dc power converter in accordance with a preferred embodiment of the present invention.

FIG. 1 is a schematic illustration of a single-phase, soft-switching, ac-to-dc power converter in accordance with a preferred embodiment of the present invention. A full-wave diode rectifier 10 is coupled to an ac voltage source $V_{in}$ for rectifying the ac voltage applied thereto. Rectifier 10 is coupled to a boost dc-to-dc power converter 12 comprising a filter inductor $L_f$ connected in series with a boost diode $D_b$ and further comprising a boost switching device $T_b$ connected across the junction between boost diode $D_b$ and filter inductor $L_f$ and ground. Although boost switching device $T_b$ (as all switching devices herein) is illustrated as a bipolar junction transistor (BJT), device $T_b$ may alternatively comprise, for example, an insulated gate bipolar transistor (IGBT) or a MOSFET, depending upon the particular application. An additional diode $D_a$ is connected in antiparallel with boost switching device $T_b$. Although diode $D_a$ is shown as being connected between the anode of diode $D_b$ and ground, diode $D_a$ could alternatively be connected between the cathode of diode $D_b$ and ground. The cathode of boost diode $D_b$ is coupled to an active-clamped resonant dc link (ACRDCL) circuit 14. In particular, the resonant dc link (RDCL) comprises a relatively small resonant capacitor $C_r$ coupled to a resonant inductor $L_r$. An active clamping circuit is coupled to the resonant circuit ($L_r$ and $C_r$) for maintaining the voltage $V_r$ across the dc link between zero and a predetermined maximum level $kV_{dc}$. The clamping circuit comprises a clamp switching device $T_c$ connected in antiparallel with a clamp diode $D_c$, the antiparallel combination of device $T_c$ and diode $D_c$ being connected in series with a clamp capacitor $C_c$. The resonant dc link is directly connected via inductor $L_r$ to the dc bus $V_{dc}$ which is supported by a dc bus capacitor $C_{dc}$.

Figure 2:
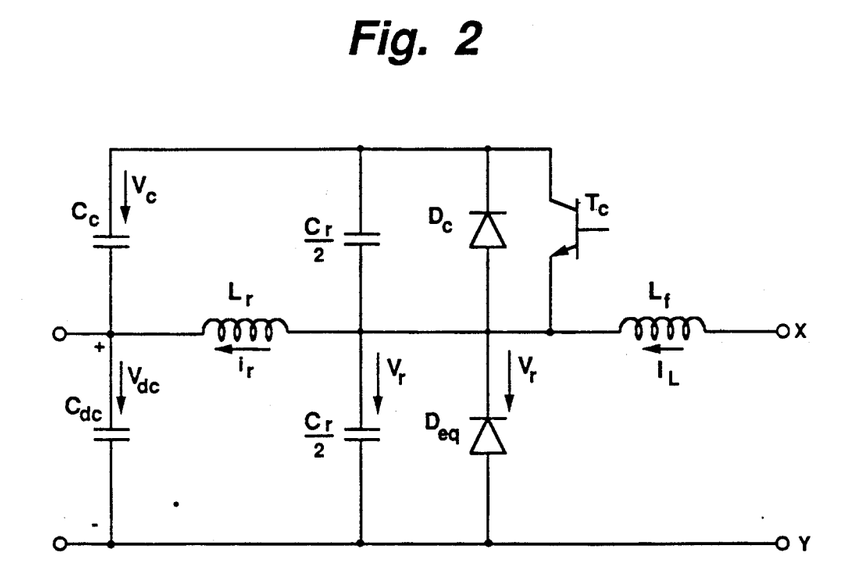
FIG. 2 is an equivalent schematic representation of the resonant link portion of the converter of FIG. 1 during one resonant cycle.

In operation, resonance is maintained according to a preferred embodiment of the present invention by control of clamp switching device $T_c$. A resonant cycle may be easily understood with reference to the equivalent dc-to-dc converter topology of FIG. 2 (as viewed from terminals X and Y in FIG. 1) in conjunction with the waveforms of FIGS. 3a and 3b. In FIG. 2, diode $D_{eq}$ represents the equivalent combination of boost diode $D_b$ and diode $D_a$ (FIG. 1). During a resonant cycle, it is assumed that the load current $I_L$ is substantially constant. With clamp diode $D_c$ conducting (at time $t_0 < t < t_1$), the resonant inductor current $i_r$ increases linearly, and energy is transferred from resonant inductor $L_r$ to clamp capacitor $C_c$. At time $t_1$, when the resonant link current $i_r$ equals the load current $I_L$, clamp switching device $T_c$ is turned on in a lossless manner, since clamp diode $D_c$ is conducting; that is, the voltage across the clamp devices $T_c$ and $D_c$ is substantially zero. The clamp switching device $T_c$ takes over when the resonant link current $i_r$ exceeds load current $I_L$ (at time $t_1 < t < t_2$). When the current $I_c$ through clamp switching device $T_c$ reaches a predetermined clamp trip current $I_{c,trip}$, the clamp switching device turns off (at time $t = t_2$). The clamp switching device turn-off process is substantially lossless because the resonant capacitor $C_r$ acts as a snubber and will therefore limit the instantaneous rate of voltage rise across clamp switching device $T_c$. The minimum clamp switching device trip current $I_{c,trip}$ is set to ensure that the voltage across the resonant link reaches zero. In particular, the minimum trip current level can be expressed as follows:

$$I_{c,\,trip} \geqq \frac{\sqrt{V_{dc}^2 - V_c^2}}{Z_r} = \frac{V_{dc}\sqrt{k(2-k)}}{Z_r},$$

where $V_c$ is the clamp voltage level, $Z_r$ is the resonant impedance, and k is the clamp voltage ratio, with impedance $Z_r$ and ratio k respectively being defined as follows:

$$Z_r = \sqrt{\frac{L_r}{C_r}}$$

$$k = \frac{V_{dc} + V_c}{V_{dc}}$$

and, assuming a constant resonant link current $i_r$, the resonant frequency of the ACRDCL can be calculated as follows:

$$f_r = \frac{1}{2\sqrt{L_r C_r}\left(\cos^{-1}(1-k) + \frac{\sqrt{k(2-k)}}{k-1}\right)}.$$

Referring again to FIGS. 2 and 3a-3b, after time $t_2$, the resonant dc link voltage $V_r$ ramps to zero where it is clamped by diode $D_{eq}$. Diode $D_{eq}$ conducts as long as the resonant current $i_r$ is greater than the load current $I_L$, i.e. during the zero voltage phase of the resonant link. While $D_{eq}$ conducts, the resonant link current $i_r$ decreases linearly. Once the resonant link current $i_r$ equals the load current $I_L$, the dc link short circuit via $D_{eq}$ is released, and the dc link voltage $V_r$ ramps up to the predetermined maximum limit $kV_{dc}$, as energy is stored in resonant inductor $L_r$. An ideal resonant link circuit reaches a voltage level $2V_{dc}$. Practically, however, the voltage level across the resonant link can only reach approximately 1.8 or 1.9 $V_{dc}$, primarily due to the limited quality factor Q of resonant inductor $L_r$ and the finite value of filter inductor $L_f$. Hence, with the clamp voltage $V_c$ set to less than 0.8 $V_{dc}$, clamp diode $D_c$ will always conduct. Accordingly, contrary to the resonant circuit control method described in U.S. Pat. No. 4,730,242, cited hereinabove, it is unnecessary to short circuit the dc link with an active device during the zero voltage phase thereof in order to boost the resonant inductor current $i_r$ and ensure voltage clamping. Furthermore, whenever boost switching device $T_b$ is turned off, there is a net flow of energy into clamp capacitor $C_c$ which tends to increase the clamp capacitor voltage $V_c$. Hence, losses in the resonant circuit are compensated for by this pulsating influx of energy, and fully decoupled control of the resonant link and the boost converter is possible. As a result, operation of the resonant link can be realized by suitable control of clamp switching device $T_c$ as a function of the clamp trip current $I_{c,trip}$ and the clamp voltage $V_c$.

Figure 4:
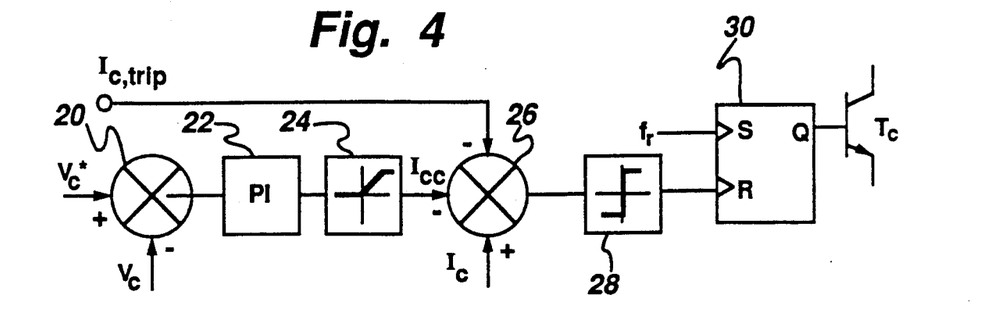
FIG. 4 is a schematic representation of a clamp switch control useful in a power converter control according to a preferred embodiment of the present invention.

FIG. 4 is a block diagram illustrating a preferred active clamp control useful in the power converter of the present invention. The clamp voltage $V_c$ is compared in a summer 20 to a commanded clamp voltage $V_c^*$. The resulting difference signal is provided to a proportional-integral controller 22 and then to a positive polarity circuit 24 to provide a control current $I_{cc}$. The clamp current $I_c$ is compared to the minimum trip current $I_{c,trip}$, offset by the control current $I_{cc}$, in a summer 26. The resulting current difference signal is provided to a comparator 28 which provides a reset signal to a flip-flop 30 which turns off the clamp switching device $T_c$ whenever the clamp current $I_c$ reaches the clamp trip current (offset by the control current $I_{cc}$). Flip-flop 30 is set every time the voltage across the clamp switching device reaches zero. As such, clamp switching device turn-on is synchronized to the resonant dc link.

Figure 3A:
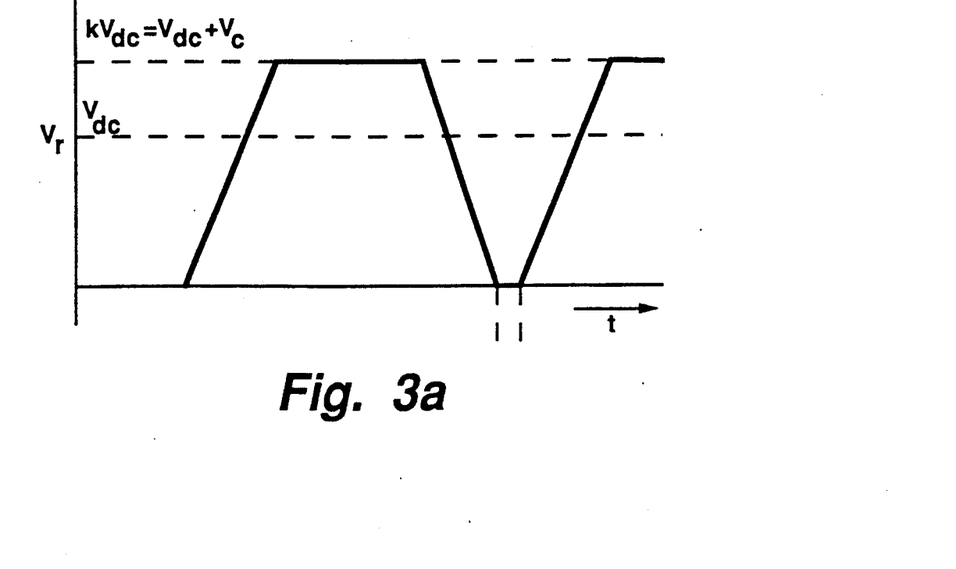
FIG. 3a is a graphical illustration of the resonant dc link voltage $V_r$ useful in understanding the operation of the converter of FIGS. 1 and 2.
Figure 3B:
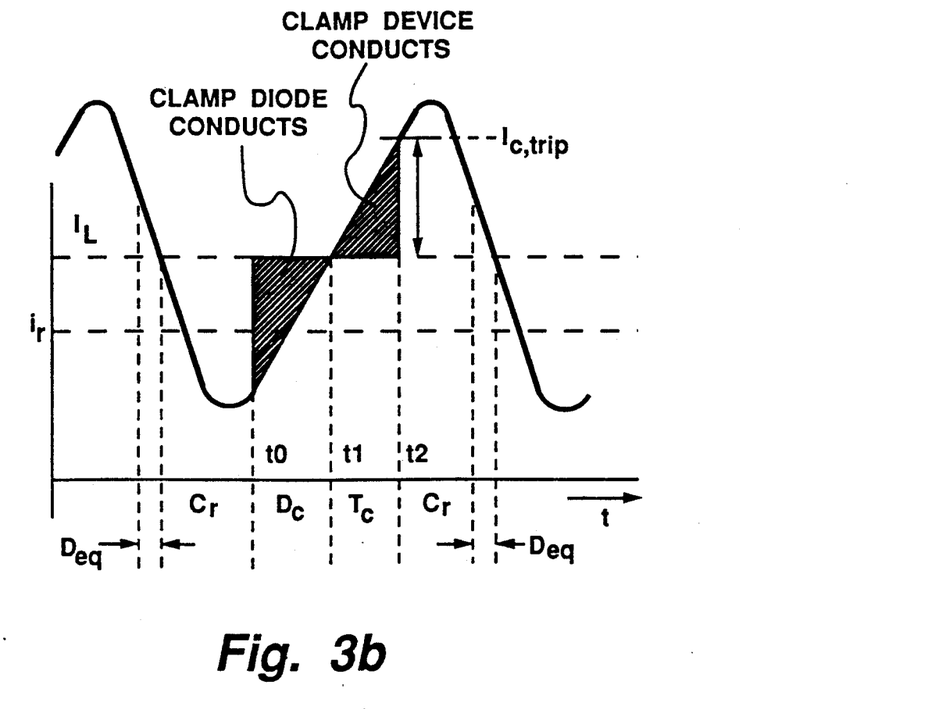
FIG. 3b is a graphical illustration of the resonant link dc current $i_r$ useful in understanding the operation of the converter of FIGS. 1 and 2.
Figure 5:
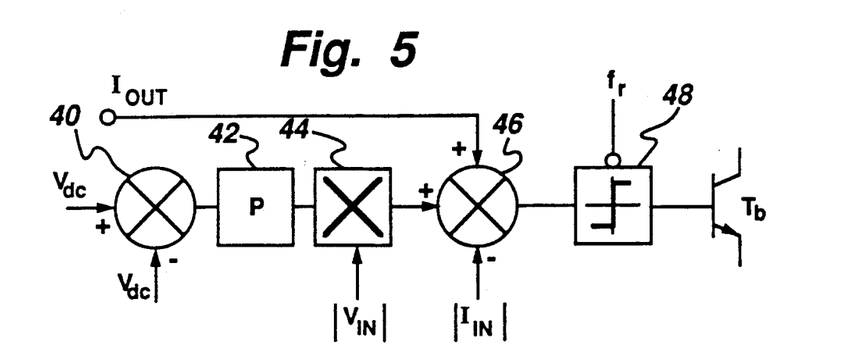
FIG. 5 is a schematic representation of a unity power factor boost switching device current modulator useful in a power converter control according to a preferred embodiment of the present invention.
Figure 6:
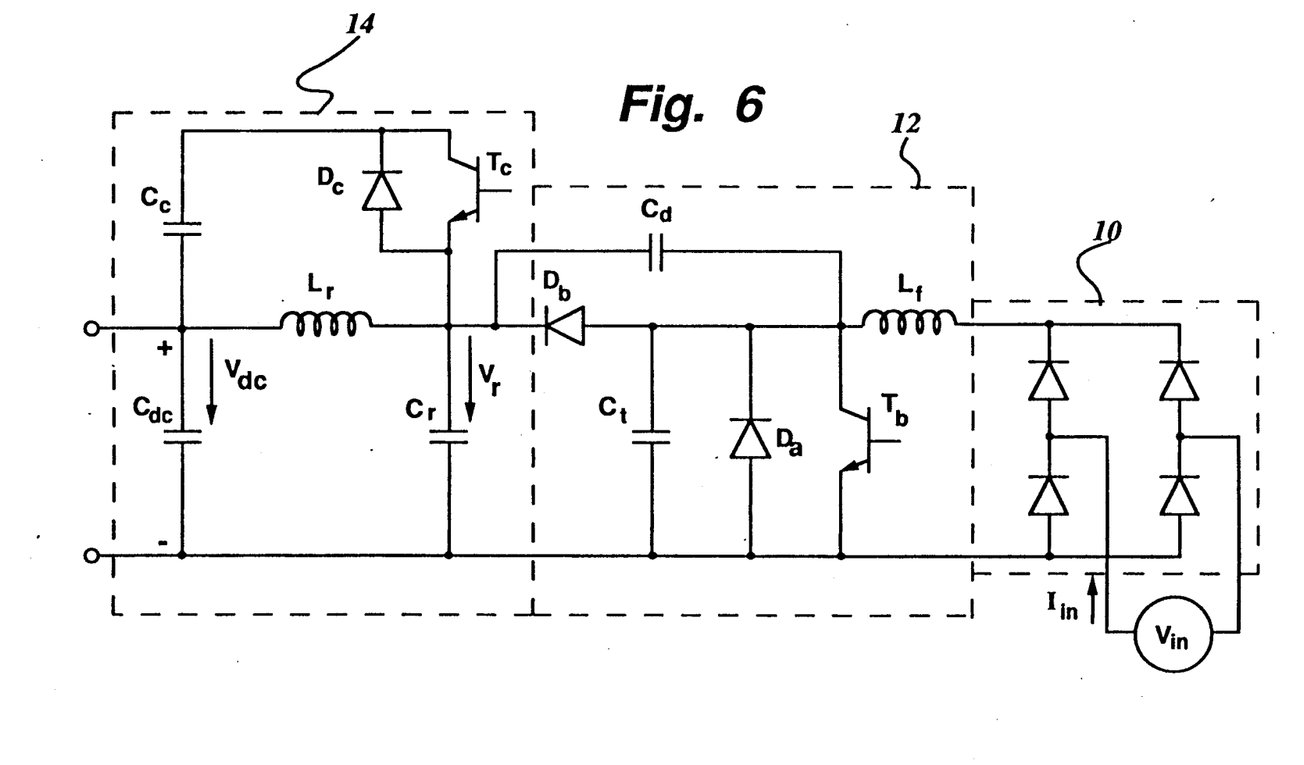
FIG. 6 is a schematic illustration of an ac-to-dc power converter with PWM current control capability in accordance with a preferred embodiment of the present invention.

In accordance with the present invention, the switching instants of the boost switching device $T_b$ are synchronized with the zero voltage instants of the resonant link. Hence, ac line current DPM can be realized with a well-known bang-bang type controller clocked by the resonant link. For example, FIG. 5 illustrates a preferred boost switching device current modulator for operation at unity power factor wherein the amplitude of the ac line current $I_{in}$ is commanded in phase with the input line voltage $V_{in}$ by amplitude modulation. The amplitude of the ac line current $I_{in}$ is controlled such that the dc bus voltage $V_{dc}$ remains constant. To this end, as illustrated in FIG. 5, the dc bus voltage $V_{dc}$ is compared to a commanded dc bus voltage $V_{dc}^*$ in a summer 40, and the resulting difference signal is provided to a proportional controller 42. The output signal from proportional controller 42 is multiplied by the absolute value of the ac line voltage $V_{in}$ in a multiplier 44. The modulated output signal from multiplier 44 is added in a summer 46 to the difference between the load current $I_L$ and the ac line current $I_{in}$. The resulting current is provided to a comparator 48 which is clocked at the resonant frequency $f_r$ to provide turn-on and turn-off signals to the boost switching device $T_b$ at the zero voltage instants of the resonant link. In particular, upon boost device $T_b$ turn-on, the ac line current $I_{in}$ increases, and energy is supplied to the boost filter inductor $L_f$ during the ensuing resonant cycle of the resonant dc link. Upon boost device turn-off, the ac line current $I_{in}$ decreases, and the energy stored in the boost filter inductor $L_f$ is supplied to the dc bus capacitor $C_{dc}$ via the resonant dc link circuit In another aspect of the present invention, the power converter of FIG. 1 may be modified to enable PWM control, resulting in reduced subharmonic content as compared with the DPM strategy described hereinabove. To this end, as illustrated in FIG. 6, snubber capacitors $C_t$ and $C_d$ are respectively added in parallel with boost switching device $T_b$ and boost diode $D_b$, respectively. In particular, snubber capacitors $C_t$ and $C_d$ ensure that voltage does not rise instantaneously across the boost switching device. In this way, substantially lossless switching during device turn-off is ensured, even if the dc link voltage is not equal to zero. Therefore, since the boost switching device can be turned off in a lossless manner at any instant during the resonant cycle, a PWM ac line current control strategy may be employed, resulting in higher quality ac line current waveforms obtainable even with a reduced filter size and at higher switching frequencies. With reference to FIGS. 3a and 3b, however, in order to avoid interfering with resonant link operation, the turn-off instants of boost switching device $T_b$ should be made to occur in the range of time between device turn-on and the instant at which clamp switching device $T_c$ is turned off, i.e. time $t_2$. Otherwise, if boost switching device $T_b$ were turned off after time $t_2$, the resonant link current $i_r$ may be insufficient to cause dc link voltage $V_r$ to go to zero.

Operation of the converter of FIG. 1 in a PWM mode in accordance with the present invention is as follows. At each zero crossing of the resonant link, boost switching device $T_b$ is turned on, thus avoiding reverse recovery losses of boost diode $D_b$ and losses due to the discharge of snubber capacitor $C_t$ into boost switching device $T_b$. When the ac line Current $I_{in}$, which is equal to the current in boost switching device $T_b$, reaches a predetermined PWM current reference level, boost switching device $T_b$ is turned off. The PWM current reference level corresponds to a rectified sine wave of amplitude proportional to required power output, thus ensuring that resonant operation is maintained.

Figure 7:
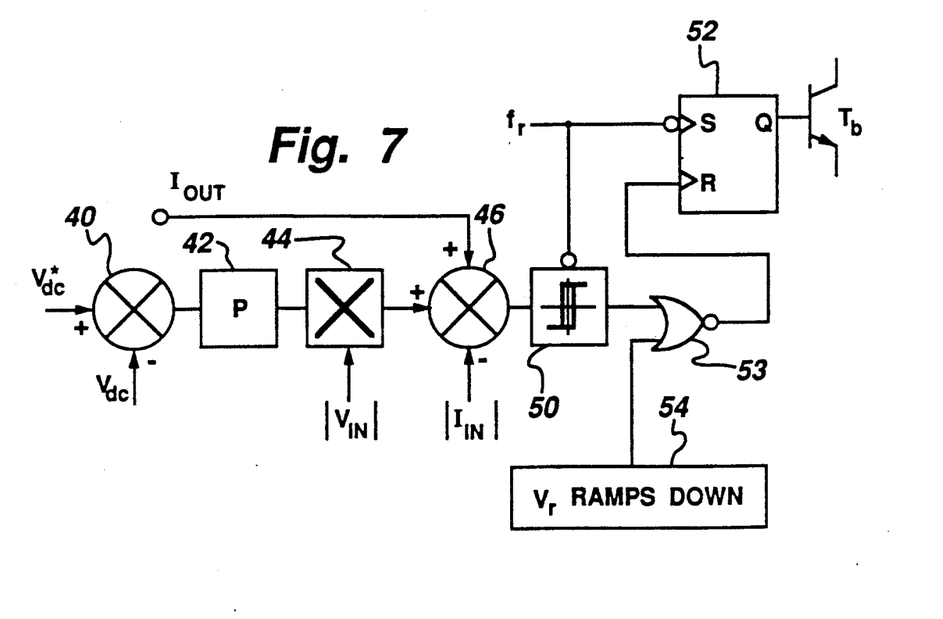
FIG. 7 is a schematic illustration of a unity factor boost switching device current modulator useful in controlling the boost switching device of FIG. 6.

FIG. 7 is a schematic illustration of a unity power factor PWM current modulator useful in controlling the boost switching device of FIG. 6. In particular, the current modulator of FIG. 5 is modified to include a comparator 50 with hysteresis coupled to a flip-flop 52 in order to provide PWM current control capability. The output current from summer 46 is supplied to comparator 50 for comparison to the PWM reference current level. The output of comparator 50 is coupled to a two-input NOR gate 53. The other input of NOR gate 53 receives the output signal of a control block 54 for determining when the voltage $V_r$ ramps downward. In operation, when the PWM reference current level is attained, flip-flop 52 is reset as long as the link voltage $V_r$ is not ramping downward, as determined by control block 54, thereby turning off boost switching device $T_b$. To turn on boost switching device $T_b$, the set input of flip-flop 52 is clocked by the resonant frequency $f_r$ to turn on the device at the zero-crossings of the resonant dc link.

Figure 8A:
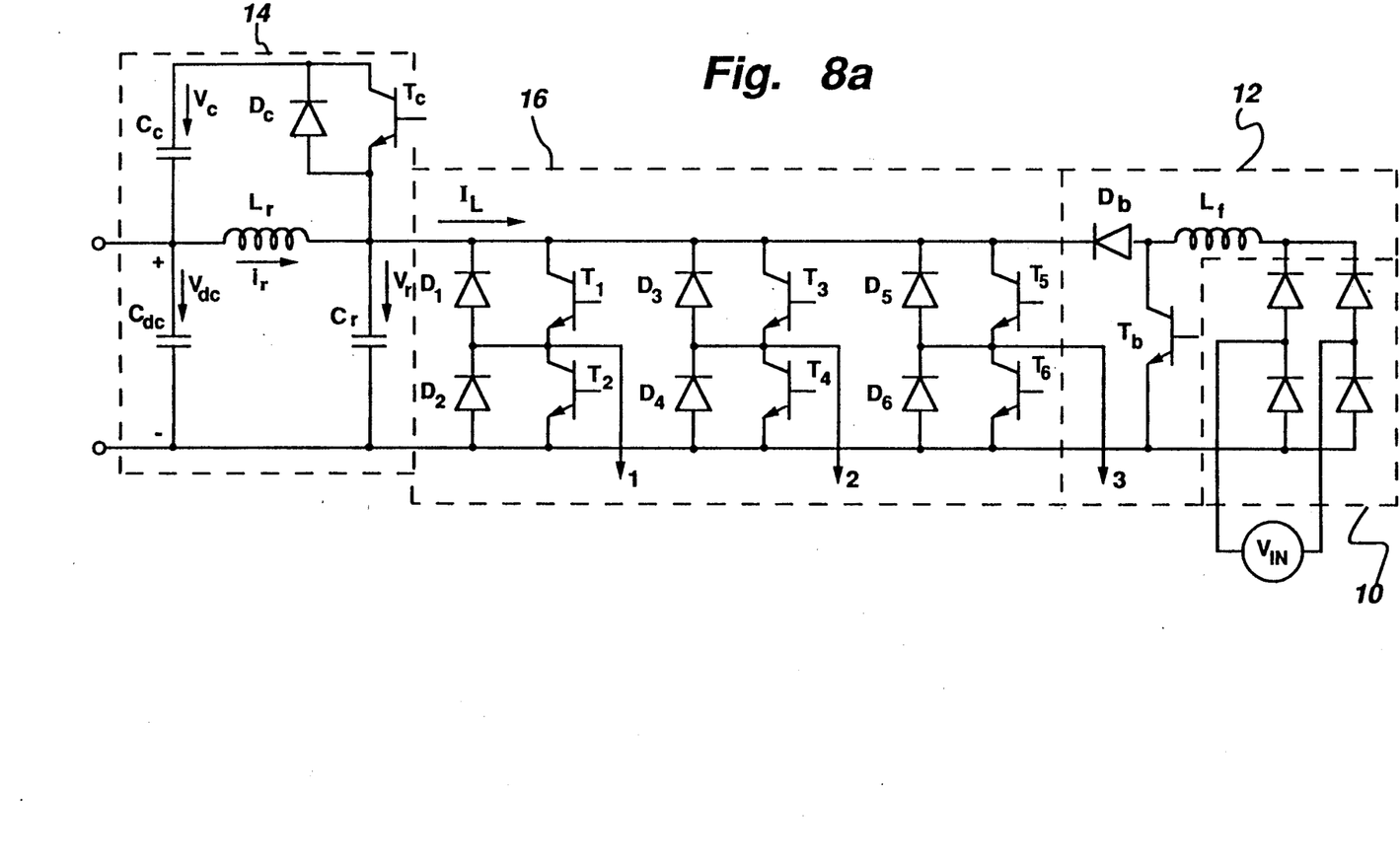
FIG. 8a is a schematic illustration of an ac-to-ac converter with DPM current control capability in accordance with a preferred embodiment of the present invention.

FIG. 8a is a schematic diagram illustrating a single-phase ac to three-phase ac converter in accordance with a preferred embodiment of the present invention. As shown, the ac-to-ac converter of FIG. 8 includes full-wave rectifier 10, boost dc-to-dc converter 12, ACRDCL 14, and a three-phase inverter 16. Each phase leg of inverter 16 is illustrated as comprising a pair of switching devices $T_1$–$T_6$, each switching device being connected in antiparallel with a diode $D_1$–$D_6$. Advantageously, in FIG. 8a, it is to be noted that a diode in antiparallel with boost switching device $T_b$ is not necessary because the inverter diodes $T_1$–$T_6$ perform the same function as diode $D_a$ of FIGS. 1 and 2, i.e. clamping the resonant dc link at zero voltage. In operation, the dc link voltage $V_r$ is converted by inverter 16 to a three-phase ac voltage according to well-known power conversion principles. The power converter of FIG. 8a is capable of DPM current control capability in the same manner as described hereinabove in reference to the ac-to-dc converter of FIG. 1.

Figure 8B:
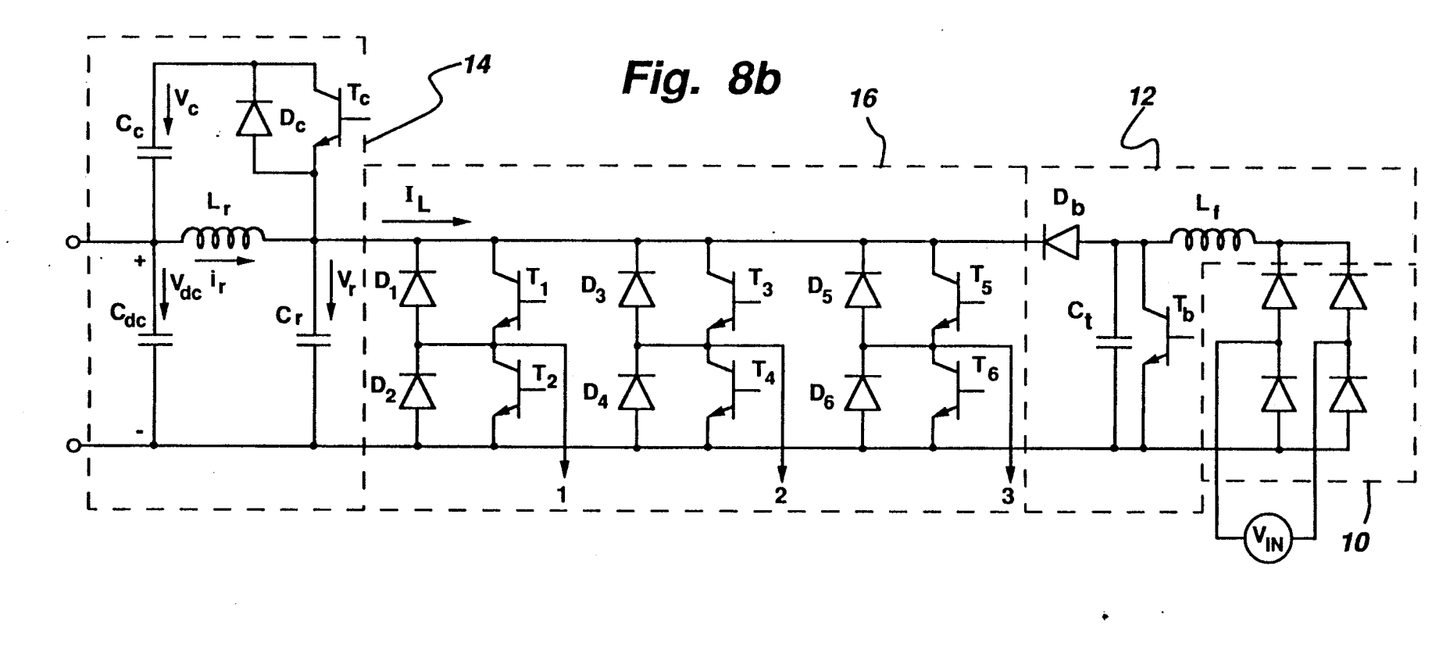
FIG. 8b is a schematic illustration of an ac-to-ac converter capable of both DPM and PWM current control of the boost converter portion thereof in accordance with a preferred embodiment of the present invention.

FIG. 8b illustrates an alternative embodiment of a single-phase ac to three-phase ac converter in accordance with the present invention. Advantageously, by adding a snubber capacitor $C_t$ in parallel with boost switching device $T_b$, either a DPM or a PWM control strategy may be employed to provide high-quality input converter waveforms at high switching frequencies. In particular, in PWM operation, snubber capacitor $C_t$ ensures that voltage does not rise instantaneously across the boost switching device. In this way, substantially lossless switching during device turn-off is ensured for the boost switching device, even if the dc link voltage is not equal to zero.

Figure 8C:
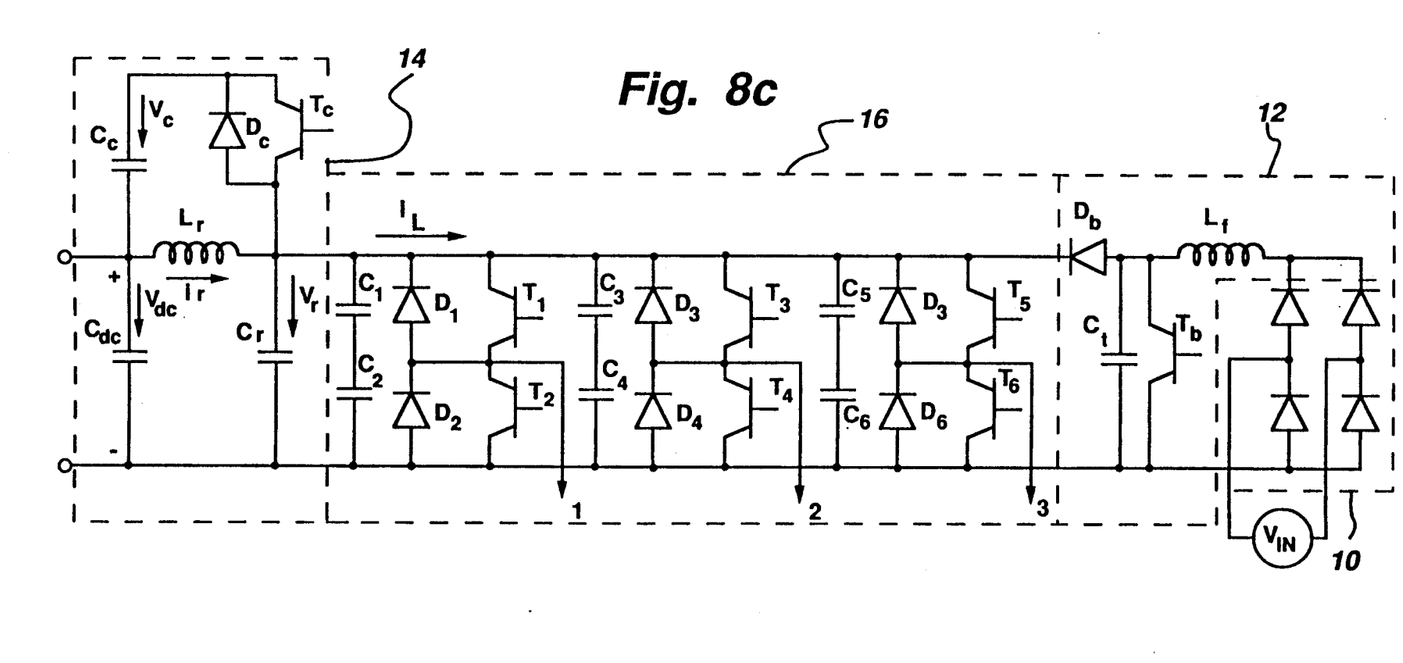
FIG. 8c is a schematic illustration of an ac-to-ac converter capable of both DPM and PWM current control of the boost converter and inverter portions thereof in accordance with a preferred embodiment of the present invention.

FIG. 8c is a modification of the converter of FIG. 8b comprising another alternative embodiment of a single-phase ac to three-phase ac converter in accordance with the present invention. Specifically, by adding snubber capacitors $C_1$–$C_6$ in parallel with inverter switching devices $T_1$–$T_6$, respectively, the inverter portion of the power converter has PWM current control capability. In particular, the addition of snubber capacitors $C_1$–$C_6$ enables substantially lossless turn-off switching of devices $T_1$–$T_6$, even when the dc link voltage $V_r$ is not equal to zero. On the other hand, without the snubber capacitors $C_1$–$C_6$, soft-switching of the inverter devices could only be achieved by using a DPM control strategy wherein the turn-on and turn-off instants were clocked to occur at the zero-voltage instants of the resonant link. Advantageously, however, the PWM control strategy of the present invention, wherein the turn-off switching instants may occur even when the dc link voltage is not equal to zero, results in improved waveform quality, even with reduced filter size and at higher frequencies.

A further advantage of employing a boost converter in an ac-to-ac converter, as shown in FIGS. 8a–8c, is that the boost converter provides a regulated voltage across the inverter switching devices.

Figure 9:
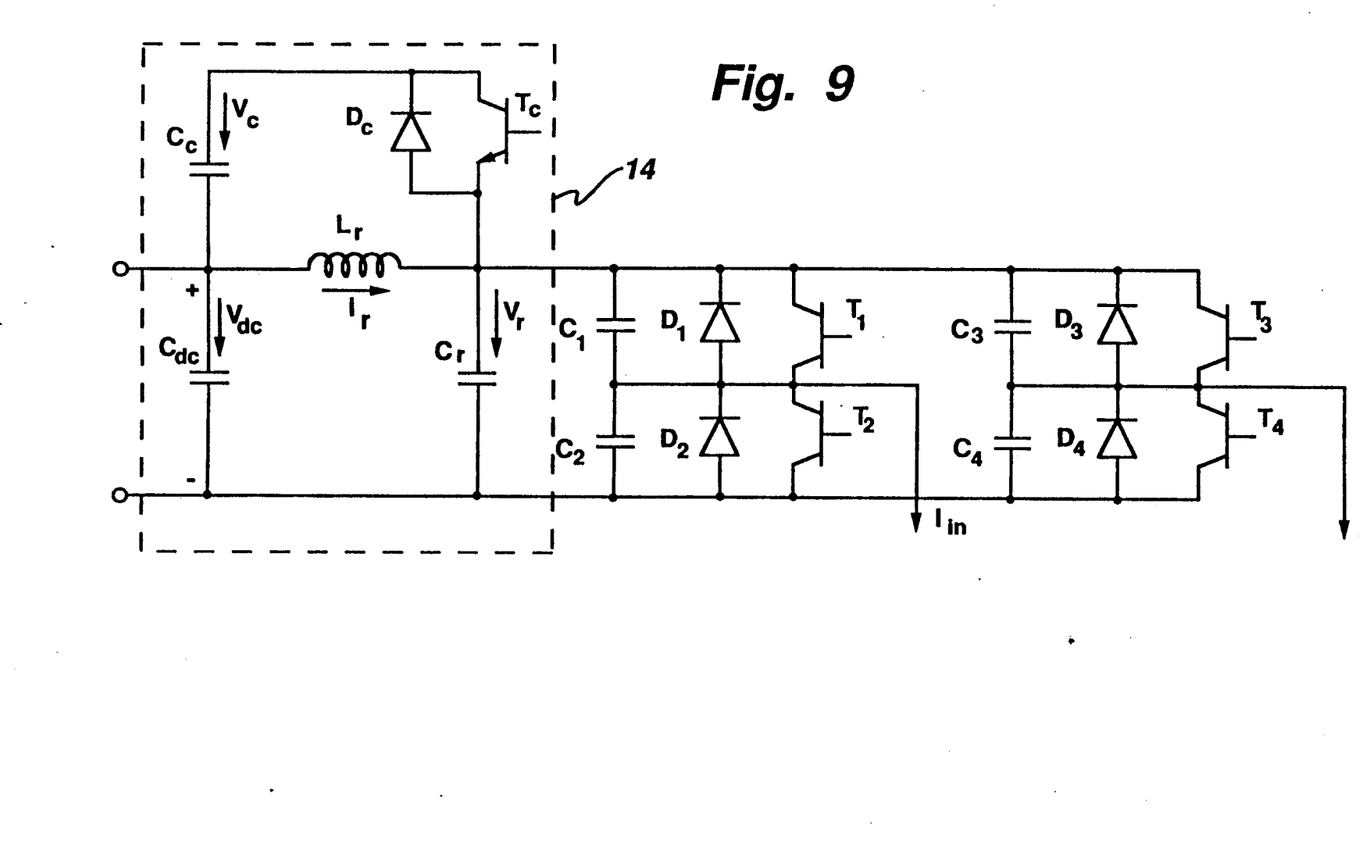
FIG. 9 is a schematic illustration of an ACRDCL full-bridge converter with PWM current control capability in accordance with a preferred embodiment of the present invention.
Figure 10:
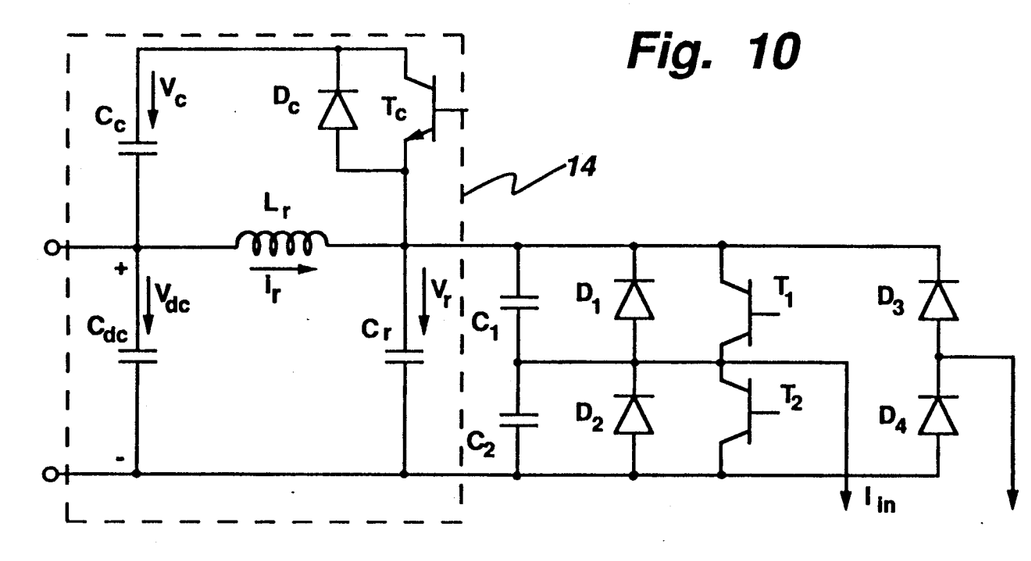
FIG. 10 is a schematic illustration of an ACRDCL half-bridge converter for operation at unity power factor with PWM current control capability in accordance with a preferred embodiment of the present invention.

In another aspect of the present invention, the PWM control strategy described hereinabove may be applied to other ACRDCL converter topologies. For example, as illustrated in FIG. 9, a full-bridge ACRDCL converter includes snubber capacitors $C_1$–$C_4$ respectively coupled in parallel with full-bridge switching devices $T_1$–$T_4$, respectively. Advantageously, if operation at unity power factor is the only desired mode, then the circuit of FIG. 9 may be reduced to a half-bridge, as illustrated in FIG. 10, thus requiring only three active devices $T_1$, $T_2$ and $T_c$. In accordance with the present invention, the addition of snubber capacitors $C_1$–$C_4$ (or capacitors $C_1$–$C_2$ in the case of a half-bridge) enables substantially lossless turn-off switching of devices $T_1$–$T_4$, even when the dc link voltage $V_r$ is not equal to zero. Hence, by adding the snubber capacitors, PWM current control is possible. On the other hand, without the snubber capacitors $C_1$–$C_4$, soft-switching could only be achieved by using a DPM control strategy wherein the turn-on and turn-off instants were clocked to occur at the zero-voltage instants of the resonant link. Advantageously, however, the PWM control strategy of the present invention, wherein the turn-off switching instants may occur even when the dc link voltage is not equal to zero, results in improved waveform quality, even with reduced filter size and at higher frequencies.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. An ac-to-dc power converter, comprising:
   a rectifier for receiving an input ac voltage and converting said input ac voltage to a first dc voltage;
   a boost converter circuit for receiving said first dc voltage and converting said first dc voltage to a second dc voltage across a dc link which is higher than said first dc voltage, said boost converter circuit having a filter inductor connected in series with a boost diode and further having a boost switching device coupled to the junction between said filter inductor and said boost diode, said boost switching device having an additional diode connected in antiparallel therewith;
   a resonant circuit comprising a resonant inductor and a resonant capacitor coupled to said boost converter circuit;
   clamping means coupled across said resonant inductor for limiting the voltage across said dc link to a predetermined maximum level, said clamping means comprising a clamp switching device connected in antiparallel with a clamp diode and further comprising a clamp capacitor connected in parallel with said clamp switching device and said clamp diode, said clamp capacitor being precharged to a predetermined voltage;
   resonant control means for controlling the switching instants of said clamp switching device so as to cause stable oscillations of said resonant circuit such that the voltage across said dc link is zero at least once during each oscillation, said clamp switching device being turned on and off in a substantially lossless manner; and
   ac current modulation means for receiving an input ac current and modulating said current by controlling the switching instants of said boost switching device in a substantially lossless manner.

2. The ac-to-dc converter of claim 1 wherein said ac current modulation means comprises:
   discrete pulse modulation means for modulating said input ac current by switching said boost switching device only when the voltage across said dc link is substantially zero.

3. The ac-to-dc converter of claim 1 wherein said ac current modulation means comprises:
   pulse width modulation means for modulating said input ac current by turning on said boost switching device only when the voltage across said dc link is substantially zero and for turning off said boost switching device only when the current therethrough reaches a predetermined current reference level; and
   snubber means for ensuring substantially lossless turn-off of said boost switching device.

4. The ac-to-dc converter of claim 3 wherein said snubber means comprises a first snubber capacitor connected in parallel with said boost switching device and a second snubber capacitor connected in parallel with said boost diode.

5. An ac-to-ac power converter, comprising:
   a rectifier for receiving an input ac voltage and converting said input ac voltage to a first dc voltage;
   a boost converter circuit for receiving said first dc voltage and converting said first dc voltage to a second dc voltage across a dc link which is higher than said first dc voltage, said boost converter circuit having a filter inductor connected in series with a boost diode and further having a boost switching device coupled to the junction between said filter inductor and said boost diode;
   a resonant circuit comprising a resonant inductor and a resonant capacitor coupled to said boost converter circuit;
   clamping means coupled across said resonant inductor for limiting the voltage across said dc link to a predetermined maximum level, said clamping means comprising a clamp switching device connected in antiparallel with a clamp diode and further comprising a clamp capacitor connected in parallel with said clamp switching device and said clamp diode, said clamp capacitor being precharged to a predetermined voltage;
   resonant control means for controlling the switching instants of said clamp switching device so as to cause stable oscillations of said resonant circuit such that the voltage across said dc link is zero at least once during each oscillation, said clamp switching device being turned on and off in a substantially lossless manner; and
   ac current modulation means for receiving an input ac current and modulating said current by controlling the switching instants of said boost switching device in a substantially lossless manner; and
   inverter means including a plurality of inverter switching devices coupled to said dc link for receiving said second dc voltage and converting said second dc voltage to an output ac voltage.

6. The ac-to-ac converter of claim 5 wherein said ac current modulation means comprises:
   discrete pulse modulation means for modulating said input ac current by switching said boost switching device only when the voltage across said dc link is substantially zero.

7. The ac-to-ac converter of claim 5 wherein said ac current modulation means comprises:
   pulse width modulation means for modulating said input ac current by turning on said boost switching device only when the voltage across said dc link is substantially zero and for turning off said boost switching device only when the current therethrough reaches a predetermined current reference level; and
   snubber means for ensuring substantially lossless turn-off of said boost switching device.

8. The ac-to-ac converter of claim 7 wherein said snubber means comprises a first snubber capacitor connected in parallel with said boost switching device and a second snubber capacitor connected in parallel with said boost diode.

9. The ac-to-ac converter of claim 5 wherein said ac current modulation means comprises:
   pulse width modulation means for modulating said input ac current by turning on said boost switching device and said inverter switching devices only when the voltage across said dc link is substantially zero and for turning off said boost switching device and said inverter switching devices only when the current therethrough reaches a predetermined current reference level; and
   snubber means for ensuring substantially lossless turn-off of said boost switching device and said inverter switching devices.

10. The ac-to-ac converter of claim 9 wherein said snubber means comprises a snubber capacitor connected in parallel with each of said inverter switching devices and said boost switching device.

11. A dc-to-dc power converter, comprising:
a boost converter circuit for receiving a first dc voltage and converting said first dc voltage to a second dc voltage across a dc link which is higher than said first dc voltage, said boost converter circuit having a filter inductor connected in series with a boost diode and further having a boost switching device coupled to the junction between said filter inductor and said boost diode, said boost switching device having an additional diode connected in antiparallel therewith;
a resonant circuit comprising a resonant inductor and a resonant capacitor coupled to said boost converter circuit;
clamping means coupled across said resonant inductor for limiting the voltage across said dc link to a predetermined maximum level, said clamping means comprising a clamp switching device connected in antiparallel with a clamp diode and further comprising a clamp capacitor connected in parallel with said clamp switching device and said clamp diode, said clamp capacitor being precharged to a predetermined voltage;
resonant control means for controlling the switching instants of said clamp switching device so as to cause stable oscillations of said resonant circuit such that the voltage across said dc link is zero at least once during each oscillation, said clamp switching device being turned on and off in a substantially lossless manner; and
ac current modulation means for receiving an input ac current and modulating said current by controlling the switching instants of said boost switching device in a substantially lossless manner.

12. The dc-to-dc converter of claim 11 wherein said ac current modulation means comprises:
discrete pulse modulation means for modulating said input ac current by switching said boost switching device only when the voltage across said dc link is substantially zero.

13. The dc-to-dc converter of claim 11 wherein said ac current modulation means comprises:
pulse width modulation means for modulating said input ac current by turning on said boost switching device only when the voltage across said dc link is substantially zero and for turning off said boost switching device only when the current therethrough reaches a predetermined current reference level; and snubber means for ensuring substantially lossless turn-off said boost switching device.

14. The dc-to-dc converter of claim 13 wherein said snubber means comprises a first snubber capacitor connected in parallel with said boost switching device and a second snubber capacitor connected in parallel with said boost diode.

15. A power converter, comprising:
a resonant circuit including a resonant inductor and a resonant capacitor for receiving an input dc voltage and for providing a resonant voltage across a dc link coupled thereto;
clamping means coupled across said resonant inductor for limiting the voltage across said dc link to a predetermined maximum level, said clamping means comprising a clamp switching device connected in antiparallel with a clamp diode and further comprising a clamp capacitor connected in parallel with said clamp switching device and said clamp diode, said clamp capacitor being precharged to a predetermined voltage;
resonant control means for controlling the switching instants of said clamp switching device so as to cause stable oscillations of said resonant circuit such that the voltage across said dc link is zero at least once during each oscillation, said clamp switching device being turned on and off in a substantially lossless manner;
inverter means including a plurality of switching devices for receiving the resonant voltage across said dc link and converting said resonant voltage to an output ac voltage;
snubber means comprising a snubber capacitor coupled in parallel with each of said switching devices for ensuring substantially lossless switching of said switching devices when they are turned off; and
pulse width modulation means for controlling the switching instants of said switching devices to operate in a pulse width modulation mode with substantially zero switching losses, said switching devices being turned on only when said resonant voltage is substantially equal to zero and being turned off only when the current therethrough reaches a predetermined current reference level.

16. The power converter of claim 15 wherein said inverter means comprises four switching devices coupled in a full-bridge configuration for generating a single-phase output ac voltage.

17. The power converter of claim 15 wherein said inverter means comprises two switching devices connected together in a half-bridge configuration for generating a single-phase output ac voltage at substantially unity power factor.

* * * * *